United States Patent [19]

Inoue

[11] Patent Number: 4,584,451
[45] Date of Patent: Apr. 22, 1986

[54] WIRE EDM WITH GUIDE MEMBER CHANGER

[75] Inventor: Kiyoshi Inoue, Tokyo, Japan

[73] Assignee: Inoue-Japax Research Incorporated, Kanagawaken, Japan

[21] Appl. No.: 603,121

[22] Filed: Apr. 23, 1984

[30] Foreign Application Priority Data

| Apr. 22, 1983 | [JP] | Japan | 58-70105 |
| Mar. 30, 1984 | [JP] | Japan | 59-61215 |
| Apr. 6, 1984 | [JP] | Japan | 59-67351 |

[51] Int. Cl.$^4$ .............................................. B23H 7/10
[52] U.S. Cl. .................. 219/69 W; 204/206; 204/297 R; 219/69 E
[58] Field of Search ............... 219/69 W, 69 M, 69 E, 219/69 R; 204/129.1, 206, 297 R

[56] References Cited

U.S. PATENT DOCUMENTS

| 3,222,494 | 12/1965 | O'Connor | 219/69 E |
| 3,891,819 | 6/1975 | Ullmann et al. | 219/69 W |
| 4,301,349 | 11/1981 | Inoue | 219/69 W |
| 4,307,279 | 12/1981 | Inoue et al. | 219/69 W |
| 4,333,000 | 6/1982 | Shimizu | 219/69 M |
| 4,353,785 | 10/1982 | Inoue | 219/69 W |

FOREIGN PATENT DOCUMENTS

| 55-24811 | 2/1980 | Japan | 219/69 W |
| 56-45328 | 4/1981 | Japan | 219/69 W |
| 2032320 | 5/1980 | United Kingdom . | |
| 2062526 | 5/1981 | United Kingdom . | |

Primary Examiner—C. L. Albritton
Assistant Examiner—Geoffrey S. Evans
Attorney, Agent, or Firm—Karl F. Ross; Herbert Dubno

[57] ABSTRACT

A machining center utilizing a traveling-electrode EDM machine in which a thin, continuous electrode element is supplied, transported, guided over a guide member and taken up to provide a continuously renewed span of electrode surface traveling over the guide member juxtaposed in electroerosive relationship with a workpiece. The guide member has a guide surface formed to impart a preselected geometry to the span of the electrode element and is detachably secured to a guide holder in the machine. The machining center includes a guide storage station for accepting a plurality of guide members the guide surfaces of which are different in geometry. A guide-member-changing device is operatively associated between the storage station and the machine to exchange guide member therebetween. The machine is also provided with an electrode handling unit for loading the electrode element onto the particular guide member transferred from the storage station and unloading the electrode element from that guide member to enable the latter to be removed by the changing device and transferred thereby back to the storage station. A numerical control unit is provided to furnish control commands to enable the system functions to be automatically performed.

10 Claims, 5 Drawing Figures

WIRE EDM WITH GUIDE MEMBER CHANGER

FIELD OF THE INVENTION

The present invention relates to a machining center and, more particularly, to a traveling-electrode electrical or electroerosive machining system using a thin, continuous renewable electrode element, e.g. in the form of a wire, tape or band, for efficiently shaping a workpiece into an intricate 3D (three-dimensional) contour or workpieces into a variety of 3D contours.

BACKGROUND OF THE INVENTION

Machining centers or systems incorporating an electroerosion machine, e.g. EDM (electrical discharge machining) machine, have already been known and increasingly adopted in the industry to improve the efficiency of machining operations. In these systems, a tool storage station is employed to store a multiplicity of formed tool electrodes to be interchangeably employed in the machining station. A plurality of formed electrodes of a similar shape and identical or slightly different size have been necessary to compensate for the erosive wear of each individual tool electrode and further to machine a workpiece with progressively increasing surface finishes. A plurality of such a set of formed tool electrodes has also been found necessary to complementarily shape various portions of a single or several three-dimensional contours to be imparted to a single workpiece. These tool electrodes must each individually be formed with precision, entailing time-consuming, laborious and costly jobs which render the conventional electroerosive machining centers still inefficient. Each tool electrode precision-formed to achieve a particular machining process loses its geometry due to wear in the process and becomes no longer useful for that process. Thus, in the use of any conventional electroerosive machining center a significantly high proportion of the cost for a given set of machining operations must have been expended for obtaining tool electrodes.

OBJECTS OF THE INVENTION

The present invention seeks to provide a machining center or system for electroerosively machining workpieces to form three-dimensional contours therein, which eliminates the need to preform a three-dimensional electrode and in which a formed electrode which does not materially lose its form and dimensions is provided on an electroerosion machine itself and a number of such electrodes to meet various machining requirements is provided automatically from a store of forms and a single source of electrode storage or supply provided in the system.

SUMMARY OF THE INVENTION

In accordance with the present invention there is provided a machining center, which comprises: (a) an electroerosion machine including means for accepting an electrode storage means for supplying a thin, continuous electrode element, means for transporting the continuous electrode element supplied from the storage means into takeup means through an electroerosive machining zone to continuously renew an active eroding surface of the electrode element traveling through the machining zone, and guide retention means for accepting and holding electrode guide means for imparting to a span of the said active electrode surface a predetermined geometry in the cutting zone; (b) electrode handling means associated with the electroerosion machine for unloading the continuous electrode element from the said electrode guide means held by the guide retention means; (c) a guide storage station for storing a plurality of electrode guide elements adapted to constitute the said electrode guide means in a selected number of different forms for imparting to the said span corresponding different geometries in the cutting zone; (d) guide transfer means operatively associated between the said storage station and the said machine for transferring from the said guide retention means at least a portion of the electrode guide means to the said magazine to replace therefor at least one preselected guide element in the magazine and thereafter for transferring the replaced guide element and securing it to the guide retention means to constitute a varied form of the electrode guide means to permit the electrode element to be loaded thereon by the said electrode handling means to establish a correspondingly varied geometry of the said span of the traveling active electrode surface in the cutting zone in the electroerosion machine.

BRIEF DESCRIPTION OF THE DRAWING

These objects and features of the present invention as well as advantages thereof will be come more readily apparent from a reading of the following description taken with reference to the accompanying drawing in which.

SPECIFIC DESCRIPTION

Figure 1:
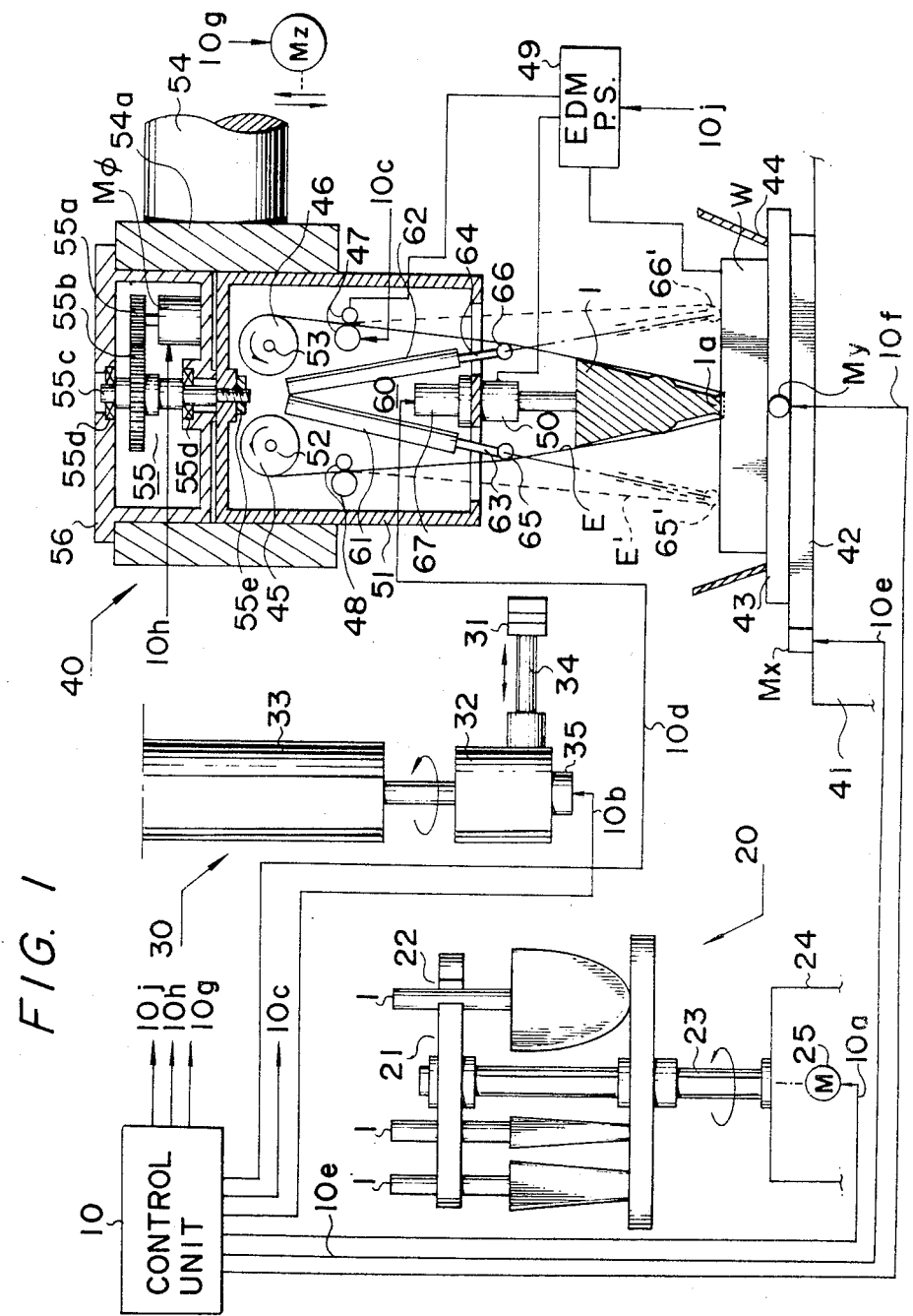
FIG. 1 is a diagrammatic view illustrating a machining center embodying the principles of the present invention.

Referring now to FIG. 1 there is shown a machining center which, according to the principles of the invention, comprises a control unit 10, a guide storage station 20, a guide changing device 30 and a traveling-electrode electroerosive machining station or machine 40 having an electrode handling apparatus 60 associated therewith. The control unit 10, which may be of the conventional numerical-control (NC) design, is here provided to furnish, in response to input data, control commands necessary to automatically operate these system components 20, 30, 40 and 60. It should be noted that the term "electroerosion" or "electroerosive machining" is herein intended to broadly cover electrical discharge machining, electrochemical machining and electrochemical-discharge machining, although the description will be made hereinafter with primary reference to electrical discharge machining (EDM).

The EDM machine or machining station 40 is shown including a base 41 which carries a compound drive table comprising an X-axis table 42 and a Y-axis table 43 arranged one upon another in the conventional crossfeed design. The compound table 42, 43 is arranged to carry a work receptable 44 in which a workpiece W is securely positioned. The X-axis table 42 is driven by an X-axis motor Mx and the Y-axis table 43 is driven by a Y-axis motor My to displace the workpiece W in a prescribed X-Y coordinate system on a horizontal plane. The work receptacle 44 is provided with a drain conduit (not shown) and may be provided to retain a dielectric liquid, e.g. deionized water, to immerse the workpiece W therein or to collect and temporarily store the liquid passing over the workpiece W or through a localized machining zone therein. One or more nozzles (not shown), or any other conventional liquid supply, may be arranged to consecutively renew the dielectric liquid stored in the receptacle 44 or passing over the machining zone.

Figure 2:
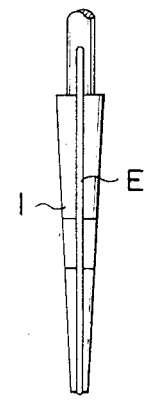
FIG. 2 is a longitudinal side view diagrammatically illustrating a guide member with an electrode element guided thereby shown mounted on the electroerosion machine in FIG. 1.
Figure 3:
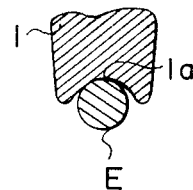
FIG. 3 is an enlarged sectional view diagrammatically illustrating the guide surface of the guide member and the electrode element in the form of a wire guided thereby in the arrangement of FIG. 2.

The machine 40 makes use of a thin, elongate continuous electrode element E for electroerosively machining the workpiece W. The electrode element E has a thickness which typically ranges between 0.1 an 5 mm but may be as thin as 0.05 mm or as thick as 5 mm, and may be in the form of a wire, tape or band. A strand of twisted or woven wires, or an elongate strip of screen or ribbon is also suitable. The electrode element E supplied from a storage reel 45 is supported by and guided over a guide member 1 juxtaposed in a machining zone with the workpiece W and is then led to a takeup reel 46. The guide member 1 has at its end (lower as shown) a guide surface 1a shaped with a selected geometry to conform thereto or to impart a corresponding geometry to, the electrode element E turned thereover. Thus, a span or stretch of the electrode element E guided with a particular geometry is provided in electroerosive machining relationship wtih the workpiece W in the machining zone. An example of the guide member 1 designed to guide the electrode element E in the form of a wire is shown in FIGS. 2 and 3. It is seen that the guide surface 1a is concave or recessed in section to accept the electrode wire and prevent it from slipping.

A capstan and a pinch roller 47 is provided at the takeup side of the guide member 1 and a set of brake rollers 48 at the supply side thereof to allow the electrode element E to be unwound from the storage reel 45 and taken up onto the takeup reel 46 and to be transported therebetween at a suitable travel speed and under a suitable tension to renew the electroeroding surface of the span or stretch continuously through the machining zone flooded with the dielectric liquid in the work receptacle 44. An EDM power supply 49 has one terminal electrically connected to the traveling electrode element E, say, via the pinch roller 47 and the other terminal electrically connected to the workpiece W. A succession of electrical discharges is effected between the continuously renewing electrode surface over the guide surface 1 and the workpiece W to electroerosively remove material from the latter.

Figure 4:
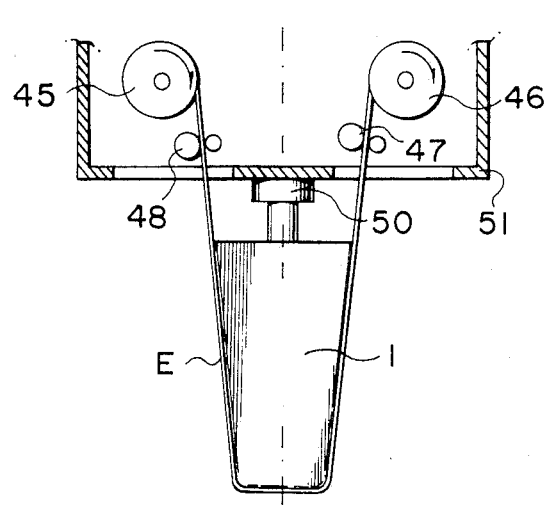
FIG. 4 is a diagrammatic front view illustrating a modified guide member for guiding an electrode element and a head member with a guide holder for retaining the guide member.
Figure 5:
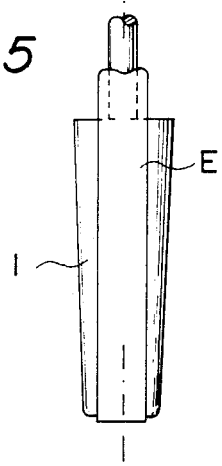
FIG. 5 is a longitudinal side view diagrammatically illustrating the guide member of FIG. 4 and the electrode element in the form of a tape guided thereby.

The guide member 1 is detachably supported by a guide holder 50 which is in turn secured to a head member 51. The capstan and pinch roller unit 47 and the brake roller unit 48 which are parts of the machine 40 are also mounted on the head member 51 in the illustrated embodiment. The storage reel 45 and the takeup reel 46 are supported by their respective accepting shafts 52 and 53 which in the illustrated embodiment are rotatably mounted on the head member 51. A modified form of the guide member 1 designed to guide the electrode element E in the form of a tape or belt and carried on the rotary head member 51 is shown in FIGS. 4 and 5.

The head member 51 is rotatably carried on an end portion 54a of a horizontally extending arm 54 which is in turn supported on a vertical column (not shown) standing upright on the base 41. The horizontal arm 54 is vertically shiftable on the column and is shifted by means of a motor Mz to vertically move the head member 51 and hence the guide member 1 and thus to achieve positioning in the direction of a Z-axis orthogonal to the X-Y plane the shaped electroeroding electrode surface of the element E turning over the guide surface 1a in machining relationship with the workpiece W.

The head member 51 is rotatable about a vertical axis and rotated by means of a rotary drive 55 retained in a casing 56 which is secured to the end portion 54a coaxially with the head member 51. The rotary drive 55 comprises a motor Mφ having a gear 55a secured to its output shaft and in mesh with a gear 55b secured to a vertical shaft 55c. The shaft 55c is secured to the head member 51 by means of a nut 56 and journaled on a pair of bearings 55d. The vertical shaft 55c is arranged to be coaxial with the guide holder 50 to rotate the head member 51 and hence the guide member 1 about the Z-axis. Thus, the angular position about the Z-axis of the electroeroding electrode surface of the element E is controlled by an angle of rotation of the motor Mφ.

The electrode handling unit 60 in the illustrated embodiment comprises a pair of actuator cylinders 61 and 62 which may again be mounted on the head member 51. The cylinders 61 and 62 have piston rods 63 and 64 slidably projecting therefrom, respectively and the rods 63 and 64 carry sheaves 65 and 66 at their ends, respectively. The cylinders 61 and 62 lie so that the piston rods 63 and 64 extend to place the sheaves 65 and 66 to be coplanar with the path of the electrode element E and to be capable of coming transversely in engagement therewith between the brake unit 48 and the guide member 1 and between the letter and the capstan and pinch roller unit 47. The cylinders 61 and 62 are operated by a pneumatic or hydraulic drive unit 67, shown mounted above the guide holder 50 on the head member 51, to advance and retract the piston rods 63 and 64 jointly. The piston rods 63 and 64 are advanced to bring the sheaves 65 and 66 into engagement with the electrode element E and to force therewith the latter away from the normal operating position between the brake unit 48 and the capstan and pinch roller unit 47. The piston rods 63 and 64 are advanced until the sheaves 65 and 66 reach positions 65' and 66' sufficient to locate the electrode element to an unloading position E', as indicated by broken lines. Then the motor Mz may be driven to shift the head member 51 upward to remove the guide member 1 away from the electrode element E in the unloading position E', thus completing the unloading of the electrode element E from the guide member 1.

The guide storage station 20 is provided with a magazine 21 for storing a plurality of guide members 1 which are different in geometry so as to be suitable to impart different shapes and/or sizes to the stretch or span of electroeroding electrode surface of the element E juxtaposed in machining relationship with the workpiece W. The different guide members 1 may be used to perform successive shaping operations for a single workpiece or successive workpieces W in the electroerosion machining station 40. The magazine 21 is provided with seats 22 in which the guide members 1 supplied or returned from the machining station 40 are respectively retained. The guide supporting magazine 21 is secured to a post 23 which is rotatably supported on a stand 24 which contains a motor 25 for rotating the post 23. The motor 25 is driven by control commands from the NC unit 10 transmitted over a line 10a to sequentially bring the guide members 1 ready for removal by a grabbing member 31 of the guide changing device 30.

The guide changing device 30 has a rotary member 32 which vertically depends from and is rotatably carried by, a base member 33. An arm 34 carrying the grabbing member 31 at its end horizontally projects extendably from the rotary member 32 which is provided with a drive unit 35. The latter is operated by control commands from the NC unit 10 transmitted over a line 10b to rotate the rotary member 32 about a vertical axis, to extend the arm 34 and to actuate the grabbing member 31 to remove a selected guide member 1 from the guide magazine 21 and to transfer the removed guide member 1 to the guide holder 50 in the electroerosion machine 40. At this time, the electrode element E extending between the storage reel 45 and the takeup reel 46 remains at the unloading position previously mentioned.

The capstan and pinch roller unit 47 is actuated by control commands from the NC unit 10 transmitted over a line 10c to commence moving the electrode element E from the supply reel 45 to the takeup reel 46 and the handling drive unit 67 is operated by control commands from the NC unit 10 transmitted over a line 10d to retract the piston rods 63 and 64 to load the electrode element E onto the guide member 1 transferred from the guide storage station 20 to the guide holder 50 by means of the changing device 30. Then, the motors Mx, My, Mz and Mφ may be actuated by respective control commands from the NC unit 10 transmitted over lines 10e, 10f, 10g, and 10h, respectively to bring and maintain the electrode element E guided over the guide surface 1a in electroerosive machining relationship with the workpiece W. The EDM power supply 49 is operated by control commands from the NC unit 10 transmitted over a line 10j to initiate and keep furnishing electroerosion pulses between the traveling electrode element E and the workpiece W.

Upon termination of a given machining operation, the motor Mz may be driven by a command signed from the NC unit 10 transmitted over the line 10h to move the head member 51 and hence the guide member 1 up by a commanded distance away from the workpiece W. The capstan and pinch roller drive unit 47 may then remain driven to hold the element E while traveling guided over the rising guide member 1. Upon deenergizing of the drive unit 47 in response to a command signal transmitted over the line 10c, the electrode handling drive unit 67 may be operated by control commands from the NC unit 10 transmitted over the line 10d to advance the piston rods 63 and 64. The guide sheaves 65 and 66 are thus advanced to unload the electrode element E from the guide member 1. The guide changing device 30 is then operated under control commands from the NC unit 10 transmitted over the line 10b to allow the guide member 1 to be removed from the guide holder 50 by the grabbing member 31 and to be transferred to the open seat on the guide storage magazine 21. The drive unit 25 in the storage station 20 is then operated by control commands from the NC unit 10 transmitted over the line a to rotate the magazine 21 by the commanded angle of rotation to bring the next preselected guide member 1 thereon to a position ready for removal by the grabbing member 31 of the changing device 30.

During the machining operation, the electrode surface guided over the shaped guide surface 1a can serve as if it were a formed solid tool electrode and, since the electrode surface is continuously renewed, the "formed electrode" for the reason of its erosive wear does not lose its form. For a given electrode element E stored in the supply reel 45, a number of "electrode forms" can be stored by storing a corresponding number of guide elements 1 in the storage station 20. It should be noted that although one guide member is employed to give one "electrode form" in the illustrated embodiment, two or more guide members may be collectively employed to constitute a guide means determining one "electrode form". To this end, two or mroe guide holders 50 may be provided on the head member 51 to constitute a guide retention means to which such two or more guide members can be detachably mounted. Moreover, it is possible to modify the "electrode form" by displacing two or more guide members relative to one another during the machining operation. The two or more guide holders should then have respective drive units associated therewith which are operated by control commands of the NC unit.

The guide member 1 is preferably composed of a heatresistant, electrically nonconductive material such as a ceramic. The guide member 1 may also be formed of an electrically conductive material such as a steel, graphite, copper, brass, a copper-tungsten alloy, a silver-tungsten alloy and may serve as a machining electrode or in addition to its function to guide the electrode element 1. The latter is typically composed of brass, copper or steel. Preferably, the electrode element has a thickness ranging between 0.03 mm and 0.2 mm and a width ranging between 1 and 100 mm. If the guide member 1 may be employed as an auxiliary electrode, the guide holder 50 is made to be electrically conductive and is shown as electrically connected to one terminal of the EDM power supply 49 to energize the guide member 1.

What is claimed is:

1. A machining center, comprising:
   an electroerosion machine including
   first means for accepting an electrode storage means for supplying a thin, continuous electrode element,
   second means for transporting the continuous electrode element supplied from the storage means into takeup means though an electroerosive machining zone to continuously renew an active, eroding surface of the electrode element traveling through the machining zone, and
   guide retention means for accepting and holding electrode guide means for imparting to a span of said active electrode surface a predetermined geometry in said cutting zone;
   electrode handling means forming a part of said electroerosion machine for unloading the continuous electrode element from said electrode guide means held by said guide retention means;
   a guide storage station for storing a plurality of electrode guide elements adapted to constitute said electrode guide means in a selected number of different forms for imparting to said span corresponding different geometries in said cutting zone; and guide transfer means operatively associated between said guide storage station and said machine for transferring from said guide retention means at least a portion of said electrode guide means to said guide storage station to replace therefor at least one preselected guide element in said guide storage station and thereafter for transferring the replaced at least one guide element and securing it to said guide retention means to constitute a varied form of said electrode guide means to permit said electrode element to be loaded thereon by said electrode handling means to establish a correspondingly varied geometry of said span of the traveling active electrode surface in the cutting zone in said electroerosion machine, said first means, second means and guide retention means remaining part of and located in said machine during operation of said guide transfer means.

2. The machining center defined in claim 1 wherein said electrode handling means includes a pair of rollers over which said continuous electrode element is guided and means for shifting said rollers between a position in which said continuous electrode element is disposed to enable introduction of a selected electrode guide means into said guide retention means and a position in which said continuous electrode element is drawn along opposite sides of said electrode guide means held by said guide retention means.

3. The machining center defined in claim 2 wherein said means for shifting said rollers includes a pair of fluid-operated cylinders mounted on said electroerosion machine.

4. The machining center defined in claim 1 wherein said guide storage station includes a turntable receiving said plurality of electrode guide elements and rotatable to present selected electrode guide elements in succession to said guide transfer means.

5. The machining center defined in claim 4 wherein said guide transfer means includes an arm swingable between said machine and said guide storage station and extensible to transfer selected electrode guide elements from said station to said machine.

6. The machining center defined in claim 5 wherein said electrode handling means includes a pair of rollers over which said continuous electrode element is guided and means for shifting said rollers between a position in which said continuous electrode element is disposed to enable introduction of a selected electrode guide means into said guide retention means and a position in which said continuous electrode element is drawn along opposite sides of said electrode guide means held by said guide retention means.

7. The machining center defined in claim 6 wherein said means for shifting said rollers includes a pair of fluid-operated cylinders mounted on said electroerosion machine.

8. The machining center defined in claim 7, further comprising a numerical controller operatively connected to said arm, said turntable and said shifting means for operating same to change electrode guide elements of said machine.

9. The machining center defined in claim 8 wherein said machine comprises a head disposed over a workpiece receiving table, said first means, second means, guide rotation means and electrode handling means all being provided on said head, said table and said head being controlled by said numerical controller.

10. The machining center defined in claim 9 wherein said continuous electrode element is a wire, said electroerosion machine is an electrodischarge machine and an electrodischarge power supply is connected between said wire and a workpiece on said table.

* * * * *